INVENTOR.
William J. Pierce
BY
S.C. Thorpe
ATTORNEY 3,131,000
FUEL FILLER DOOR AND HOLD-OPEN
William J. Pierce, Detroit, Mich., assignor to General
Motors Corporation, Detroit, Mich., a corporation of
Delaware
Filed Oct. 4, 1962, Ser. No. 228,461
1 Claim. (Cl. 296—1)

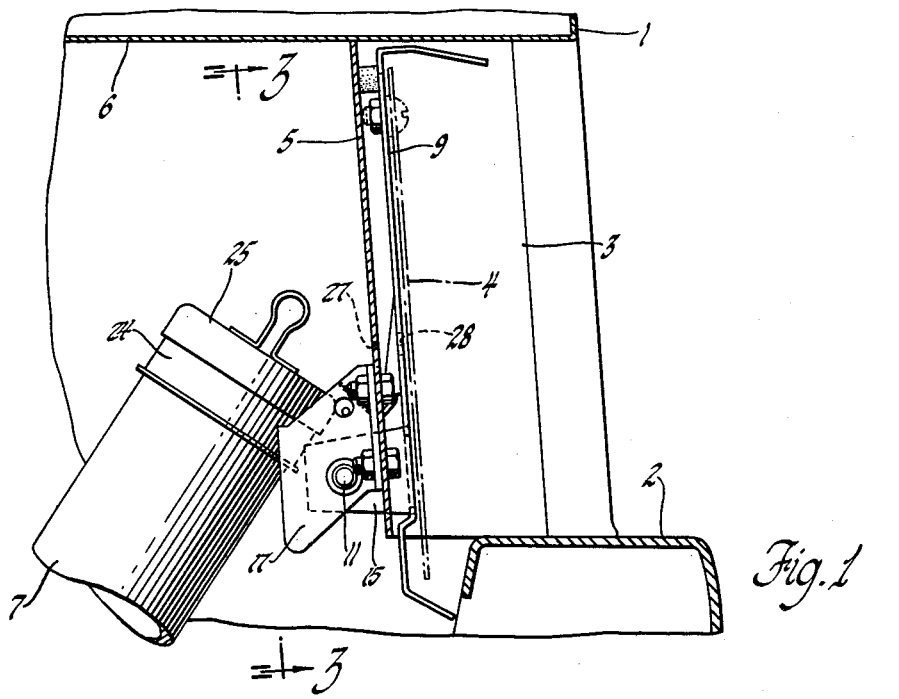

This invention relates to access doors in automotive vehicle body shells opposite the fuel tank filler pipe inlet, and particularly means for locating the filler pipe closure in door hold-open position during filling of the vehicle fuel tank.

Increasing use has been made of fuel filler types concealed within the exterior body shell or panel and accessible through an opening which is normally closed by a swingable door. Such access doors have, for example, been commonly located in the fenders, rear quarter panels and in the rear panels below the trunk lids of passenger automobiles. In the latter location, the door may also serve as a mounting plate for the vehicle license plate. When the vehicle fuel tank is being refilled the door is held open from its normally spring biased closed position, and the cap or other closure is removed from the filler pipe preparatory to inserting the delivery nozzle through the opening and into the open end of the pipe. After completing the tank fill, it frequently happens that the nozzle is withdrawn, allowing the door to reclose, without replacing the closure cap.

It is the principal object of this invention to improve such access door arrangements by providing means to conveniently position the filler pipe closure cap upon its removal from the pipe so as to insure against its loss and reclosing of the door without the cap being reinstalled on the pipe when the tank filling operation has been completed. More specifically, my invention enables use of the closure cap to retain the access door in open position after removal of the fuel delivery nozzle, whereby such open position of the door serves to indicate that the closure cap has not been replaced on the pipe.

The invention will be more clearly understood from the following description of one preferred embodiment thereof selected for illustration, having reference to the drawings, wherein:

FIGURE 1 is a vertical sectional view through the rear end of an automotive vehicle body shell having a filler pipe access opening and door therefor embodying the invention, the door being shown in closed position;

FIGURE 2 is a view similar to FIGURE 1 but showing the door in open position and the pipe closure cup in position to block closing of the door;

Figure 3:
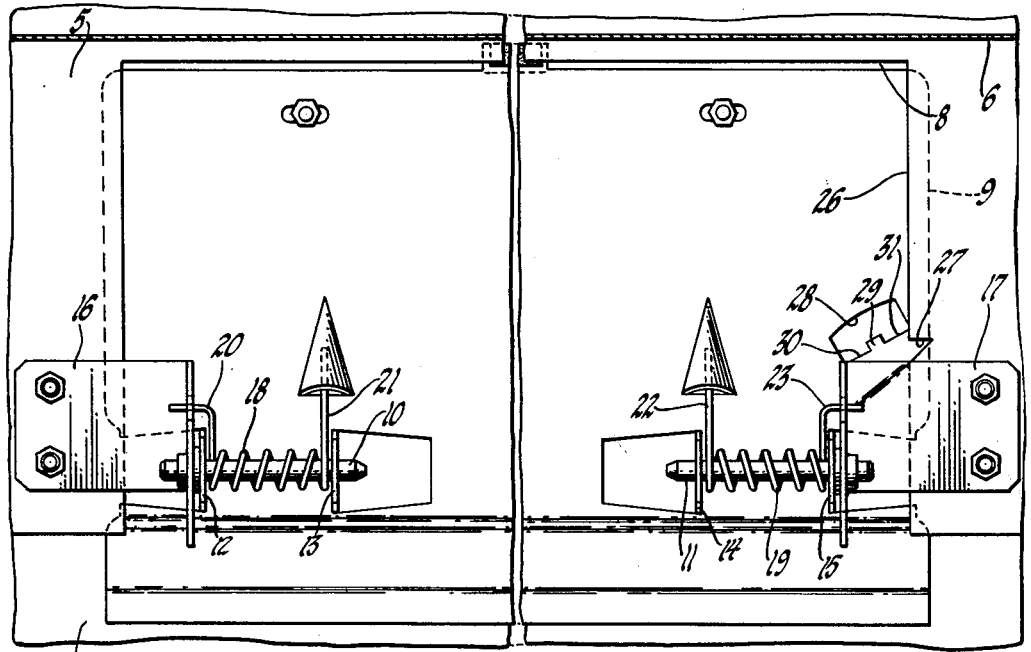
FIGURE 3 is a view of the door and access opening as viewed from the interior of the body shell in the direction of the arrows 3—3 shown in FIGURE 1.

The rear end of an automotive vehicle body shell of the passenger type is shown as comprising a rear panel 1 extending above the vehicle rear bumper 2. The panel 1 forms a recess 3 in which may be disposed the vehicle rear license plate, as indicated at 4 in phantom outline in FIGURES 1 and 2. The forward or inner extremity of this recess is illustrated as a vertical wall which may be formed as a depressed portion of the panel 1. A horizontally extending portion 6 thereof cooperates with the wall 5 and main rear panel to define a compartment of the body shell into which extends the vehicle fuel filler pipe 7. An access opening 8 is provided in the wall 5 through which a fuel nozzle (not shown) may be inserted for delivery of fuel to the pipe 7. A door 9 serves to normally close this opening, being swingable from its position shown in FIGURE 1 to its open position shown in FIGURE 2. The axis of its swinging movement is provided by shafts 10 and 11 which extend through apertures in brackets 12, 13, 14 and 15 fixed to the door, and stationary brackets 16 and 17 secured to the wall 5. Torsion springs 18 and 19 embrace the shafts 10 and 11, respectively, and have their ends 20 and 21, and 22 and 23 retained in suitable apertures in the brackets. As shown, these springs serve to bias the door to its closed position of FIGURE 1.

Figure 4:
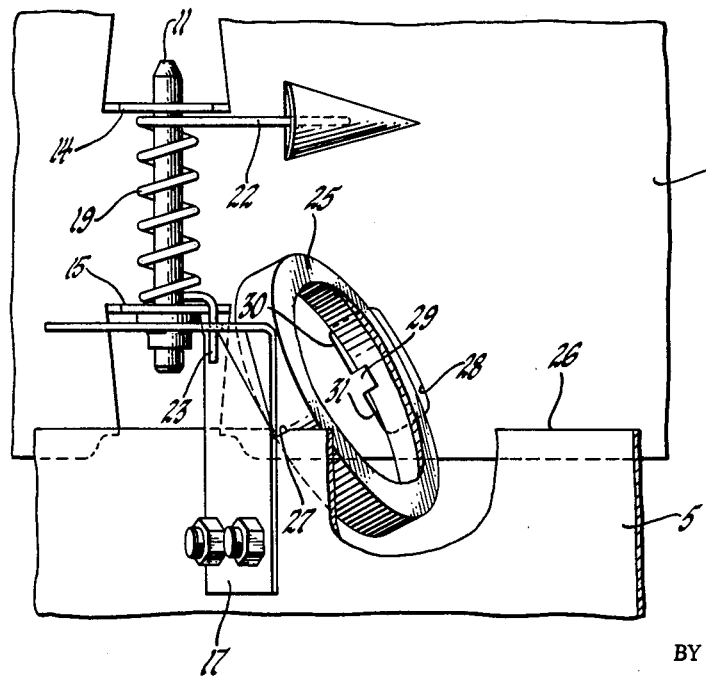
FIGURE 4 is a fragmentary view taken in the direction of the arrows 4—4 of FIGURE 2.

The inlet end 24 of the filler pipe is provided with suitable closure means in the form of a shallow cup-shaped cap 25, which when removed during a filling operation is inserted between the door and the wall 5 of the body shell, hereinafter described. As best shown in FIGURES 3 and 4 one side edge 26 of the access opening 8 is provided with a cap latchable recess in the form of a generally triangular shape notch 27, and a cooperating recess in the form of a slot 28 is provided in the door 9, generally opposite the edge 26 of the opening. As indicated, this slot 28 is generally C-shaped, with a tab-like portion 29 of the door extending between the two legs 30 and 31 of the slot. With the cap 24 removed from the filler pipe and located as shown in FIGURES 2 and 4, diametrically opposite portions of the cap are receivable within the slot 28 and notch 27 to block closing of the door. The tab portion 29 assists in retaining the cap within the slot 28, this tab extending into the open end of the cap, and the diametrically opposite open edge of the cap extending into the notch 27.

The invention thus provides a convenient resting place for the filler pipe cap upon opening the door 9 to permit insertion of the fuel delivery nozzle; and after the filling is completed and the nozzle is withdrawn, the cap functions as a stay to hold the door in open position until the cap is replaced on the pipe. Until such replacement, the door in open position serves to indicate that cap has not been replaced. By thus drawing attention to such fact, the loss of the cap and of fuel from the open filler pipe during subsequent vehicle operation is prevented.

While only one embodiment of the invention has been illustrated and described, it is appreciated that minor changes and rearrangements of the parts may be made without departing from the spirit and scope of the invention which I now claim.

I claim:

In an automotive vehicle having a body shell with an opening therein, a fuel filler pipe extending into the body shell and having its inlet end disposed for access through said opening, a door normally closing said opening but swingable about an axis adjacent one edge of the door to expose said opening for access to its filler pipe, means biasing said door closed, closure means for said inlet end of the pipe, said closure means being removable from the pipe for insertion in door holding-open relation between the door and the body shell adjacent said opening, said body shell adjacent said opening and said door having means latchably engageable with oppositely disposed surfaces of said closure means when said closure means is inserted therebetween, said latchably engageable means comprising recesses in the body shell adjacent said opening and in the door adapted to receive oppositely disposed extremities of said closure means, said closure means being in the form of a shallow cup-shaped cap and said recesses consisting of a notch in the edge of the body shell defining one side of said opening and a slot in the door into which opposite side walls of the cap are receivable when the door is opened, said slot being generally C-shaped with the legs of the C being disposed to receive spaced portions of one side wall of the cap with that portion of the door between said legs extending into the open end of the cap.

References Cited in the file of this patent
UNITED STATES PATENTS

| | | |
|---|---|---|
| 2,783,057 | Buck | Feb. 26, 1957 |
| 2,846,261 | Nickles | Aug. 5, 1958 |
| 2,899,095 | Figaretti | Aug. 11, 1959 |
| 2,994,542 | Plummer | Aug. 1, 1961 |